(12) United States Patent
Teranishi et al.

(10) Patent No.: US 9,327,246 B2
(45) Date of Patent: *May 3, 2016

(54) HONEYCOMB-SHAPED CERAMIC SEPARATION-MEMBRANE STRUCTURE

(71) Applicant: NGK INSULATORS, LTD., Nagoya (JP)

(72) Inventors: Makoto Teranishi, Nagoya (JP); Makoto Miyahara, Nagoya (JP); Makiko Ichikawa, Nagoya (JP); Hideyuki Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 142 days.

This patent is subject to a terminal disclaimer.

(21) Appl. No.: 14/031,522

(22) Filed: Sep. 19, 2013

(65) Prior Publication Data

US 2014/0021129 A1 Jan. 23, 2014

Related U.S. Application Data

(63) Continuation of application No. PCT/JP2012/056884, filed on Mar. 16, 2012.

(30) Foreign Application Priority Data

Mar. 22, 2011 (JP) ................................. 2011-062393

(51) Int. Cl.
*B01D 71/02* (2006.01)
*C04B 38/00* (2006.01)
(Continued)

(52) U.S. Cl.
CPC .......... *B01D 71/024* (2013.01); *B01D 46/2425* (2013.01); *B01D 46/2429* (2013.01);
(Continued)

(58) Field of Classification Search
CPC ........... B01D 46/0001; B01D 46/2425; B01D 46/2429; B01D 46/2466; B01D 53/228; B01D 63/066; B01D 67/0051; B01D 69/02; B01D 71/028; C04B 38/00; C04B 38/0006; C04B 38/0009; C04B 38/0054
See application file for complete search history.

(56) References Cited

U.S. PATENT DOCUMENTS 4,719,058 A 1/1988 Komoda
4,983,423 A * 1/1991 Goldsmith ............. B01D 39/20
210/496

(Continued)

FOREIGN PATENT DOCUMENTS

CN 1863749 A 11/2006
EP 1 609 519 A1 12/2005
(Continued)

OTHER PUBLICATIONS

European Search Report, European Application No. 12760684.6, dated Sep. 12, 2014 (7 pages).
(Continued)

*Primary Examiner* — Katherine Zalasky
*Assistant Examiner* — Benjamin Lebron
(74) *Attorney, Agent, or Firm* — Burr & Brown, PLLC

(57) ABSTRACT

There is provided a honeycomb-shaped ceramic separation-membrane structure having higher pressure resistance than conventional ones and being capable of reducing production costs. The honeycomb-shaped ceramic separation-membrane structure is provided with a honeycomb-shaped base material, an intermediate layer, and a separation layer. At least part of a ceramic porous body has a structure where aggregate particles are bonded to one another by an inorganic bonding material component. In the ceramic separation-membrane structure, an internal pressure fracture strength capable of fracturing the structure by application of water pressure inside the cells is 7 MPa or more.

6 Claims, 5 Drawing Sheets

(51) Int. Cl.
    *B01D 46/24*     (2006.01)
    *B01D 63/06*     (2006.01)
    *B01D 53/22*     (2006.01)
    *C04B 111/00*     (2006.01)

(52) U.S. Cl.
    CPC .......... *B01D63/066* (2013.01); *C04B 38/0019* (2013.01); *C04B 2111/00612* (2013.01); *C04B 2111/00801* (2013.01)

(56) References Cited

U.S. PATENT DOCUMENTS

| | | | |
|---|---|---|---|
| 6,309,612 | B1 * | 10/2001 | Balachandran et al. ...... 422/222 |
| 2002/0179519 | A1 * | 12/2002 | Yorita et al. ............ 210/321.73 |
| 2004/0173094 | A1 | 9/2004 | Nakayama et al. |
| 2004/0187690 | A1 | 9/2004 | Suzuki |
| 2005/0229779 | A1 | 10/2005 | Nakayama et al. |
| 2007/0026190 | A1 | 2/2007 | Baba |
| 2007/0072761 | A1 | 3/2007 | Lee et al. |
| 2008/0093290 | A1 | 4/2008 | Isomura et al. |
| 2010/0132559 | A1 * | 6/2010 | Ishida et al. ........................ 96/5 |
| 2010/0144512 | A1 * | 6/2010 | Uchikawa et al. ................ 502/4 |
| 2011/0301017 | A1 | 12/2011 | Niino et al. |

FOREIGN PATENT DOCUMENTS

| | | |
|---|---|---|
| JP | 61-238315 A1 | 10/1986 |
| JP | 06-016819 A1 | 1/1994 |
| JP | 07-267752 A1 | 10/1995 |
| JP | 3128517 B2 | 1/2001 |
| JP | 2001-300273 A1 | 10/2001 |
| JP | 2002-273129 A1 | 9/2002 |
| JP | 2002-282629 A1 | 10/2002 |
| JP | 3336157 B2 | 10/2002 |
| JP | 2003-176185 A1 | 6/2003 |
| JP | 2003-286018 A1 | 10/2003 |
| JP | 2004-066188 A1 | 3/2004 |
| JP | 2004-083375 A1 | 3/2004 |
| JP | 2004-299966 A1 | 10/2004 |
| JP | 2006-263517 A1 | 10/2006 |
| JP | 3933907 B2 | 6/2007 |
| JP | 3953833 B2 | 8/2007 |
| JP | 4006107 B2 | 11/2007 |
| JP | 2010-051894 A1 | 3/2010 |
| WO | 2010/101035 A1 | 9/2010 |

OTHER PUBLICATIONS

Chinese Office Action (Application No. 201280014386.0) and Search Report dated Oct. 24, 2014.
International Search Report and Written Opinion dated Jun. 26, 2012.
M. J. den Exter et al., "*Studies in Surface Science and Catalysis,*" vol. 84, Ed. By J. Weitkamp et al., Elsevier (1994), pp. 1159-1166.

\* cited by examiner

HONEYCOMB-SHAPED CERAMIC SEPARATION-MEMBRANE STRUCTURE

BACKGROUND OF THE INVENTION

1. Field of the Invention

The present invention relates to a honeycomb-shaped ceramic separation-membrane structure having pressure resistance.

2. Description of Related Art

In recent years, there has been used a ceramic filter in order to selectively collecting only a specific component from a mixture (mixed fluid) of many components. Since a ceramic filter is superior to an organic polymer filter in mechanical strength, durability, corrosion resistance, and the like, it is preferably applied to removal of suspended substances, bacteria, dust, and the like in liquid or gas in the wide fields of water treatment, exhaust gas treatment, medicine, food, etc.

In such a ceramic filter, it is necessary to make the membrane area (area of the separation membrane) large in order to improve water permeability with securing the separation performance, and, for the purpose, it is desirable to have a honeycomb shape. Furthermore, a honeycomb-shaped filter (honeycomb-shaped ceramic separation-membrane structure) has advantages of being hardly broken and cost saving in comparison with a tube-typed filter. In many cases, a honeycomb-shaped ceramic separation-membrane structure has a circular columnar external shape and is provided with a porous base material having a large number of parallel flow passages (referred to as cells) formed in the axial direction of the structure inside the structure. Furthermore, a separation membrane having small pore diameter in comparison with the porous base material is formed on the inside wall faces forming the cells.

In the honeycomb-shaped ceramic separation-membrane structure (precise filtration membrane, ultrafiltration membrane, pervaporation membrane, gas separation membrane, and reverse osmosis membrane), it is desirable to increase the permeation flow rate by applying high pressure upon operation. In particular, in ultrafiltration, gas separation, and a reverse osmosis membrane, since the permeation coefficient of the separation membrane is small, it is necessary to perform separation and refinement with applying high operating pressure. The Patent Document 1 reports a pressure resistant zeolite separation membrane having a zeolite membrane thickness of 0.5 to 30 μm.

The Patent Document 2 discloses a cross-flow filtration device having an improved permeation flow rate.

PRIOR ART DOCUMENT

Patent Document

Patent Document 1: JP No. 3128517
Patent Document 2: JP-B-6-016819

SUMMARY OF THE INVENTION

However, a conventional honeycomb-shaped ceramic separation-membrane structure may be fractured under an operation pressure of 5 MPa or more. In addition, when the porous base material is a self-sintering type as in the Patent Document 1, the firing temperature is high, and it causes high costs. Though the shape of the separation membrane is specified from the viewpoint of the permeation flow amount in the Patent Document 2, there is no particular description regarding strength.

The present invention aims to provide a honeycomb-shaped ceramic separation-membrane structure having higher pressure resistance than conventional ones and being capable of reducing production costs.

It was found out that the aforementioned problem can be solved by allowing the separation membrane structure to be provided with an intermediate layer and allowing at least part of the ceramic porous body to have a structure where aggregate particles are bonded to one another by an inorganic bonding material component. That is, according to the present invention, there is provided a honeycomb-shaped ceramic separation-membrane structure having an internal pressure fracture strength of 7 MPa or more when the structure is fractured upon applying pressure to the inside of the cells.

According to a first aspect of the present invention, a honeycomb-shaped ceramic separation-membrane structure comprising: a honeycomb-shaped base material having partition walls of a ceramic porous body having a large number of pores formed therein and a plurality of cells formed by the partition walls and functioning as passages for a fluid passing through the ceramic porous body, an intermediate layer of a ceramic porous body having a large number of pores having a small average pore diameter in comparison with a surface of the base material and being disposed on the surface of the base material, and a separation layer disposed on a surface of the intermediate layer; wherein at least a part of the base material and the intermediate layer has a structure where aggregate particles are bonded to one another by an inorganic bonding material component, and an internal pressure fracture strength fracturing the structure when pressure is applied to the inside of the cells is 7 MPa or more.

According to a second aspect of the present invention, the honeycomb-shaped ceramic separation-membrane structure according to the first aspect is provided, wherein the intermediate layer thickness, which is the thickness of the intermediate layer, is 150 μm or more and 500 μm or less.

According to a third aspect of the present invention, the honeycomb-shaped ceramic separation-membrane structure according to the first or second aspects is provided, wherein the base material thickness excluding the intermediate layer and the separation layer at the shortest portion between the cells is 0.51 mm or more and 1.55 mm or less.

According to a fourth aspect of the present invention, the honeycomb-shaped ceramic separation-membrane structure according to any one of the first to third aspects is provided, wherein the proportion of an inorganic bonding material component in an inorganic solid content of the intermediate layer is 26% by mass or more and 42% by mass or less.

According to a fifth aspect of the present invention, the honeycomb-shaped ceramic separation-membrane structure according to any one of the first to fourth aspects is provided, wherein the aggregate particles of the base material and the intermediate layer are one selected from the group consisting of alumina, titania, mullite, powder of potsherd, and cordierite, and the inorganic bonding material of the base material and the intermediate layer is one selected from the group consisting of sinterable alumina, silica, glass frit, clay mineral, and sinterable cordierite.

According to a sixth aspect of the present invention, the honeycomb-shaped ceramic separation-membrane structure according to any one of the first to fifth aspects is provided, wherein the base material has an average pore size of 5 to 25 μm, and the intermediate layer has an average pore size of 0.005 to 2 μm.

According to a seventh aspect of the present invention, the honeycomb-shaped ceramic separation-membrane structure according to any one of the first to sixth aspects is provided, which is a gas separation membrane used for gas separation.

According to an eighth aspect of the present invention, the honeycomb-shaped ceramic separation-membrane structure according to any one of the first to seventh aspects is provided, wherein the separation layer is formed of zeolite.

According to a ninth aspect of the present invention, the honeycomb-shaped ceramic separation-membrane structure according to an eighth aspect is provided, wherein the separation layer is formed of DDR type zeolite.

According to a tenth aspect of the present invention, the honeycomb-shaped ceramic separation-membrane structure according to a ninth aspect is provided, which is a gas separation membrane used for selectively separating carbon dioxide.

A honeycomb-shaped ceramic separation-membrane structure of the present invention has an internal pressure fracture strength of 7 MPa or more and high fracture strength.

DETAILED DESCRIPTION OF THE INVENTION

Hereinbelow, embodiments of the present invention will be described with referring to drawings. The present invention is not limited to the following embodiments, and changes, modifications, and improvements may be made as long as they do not deviate from the scope of the invention.

Figure 1:
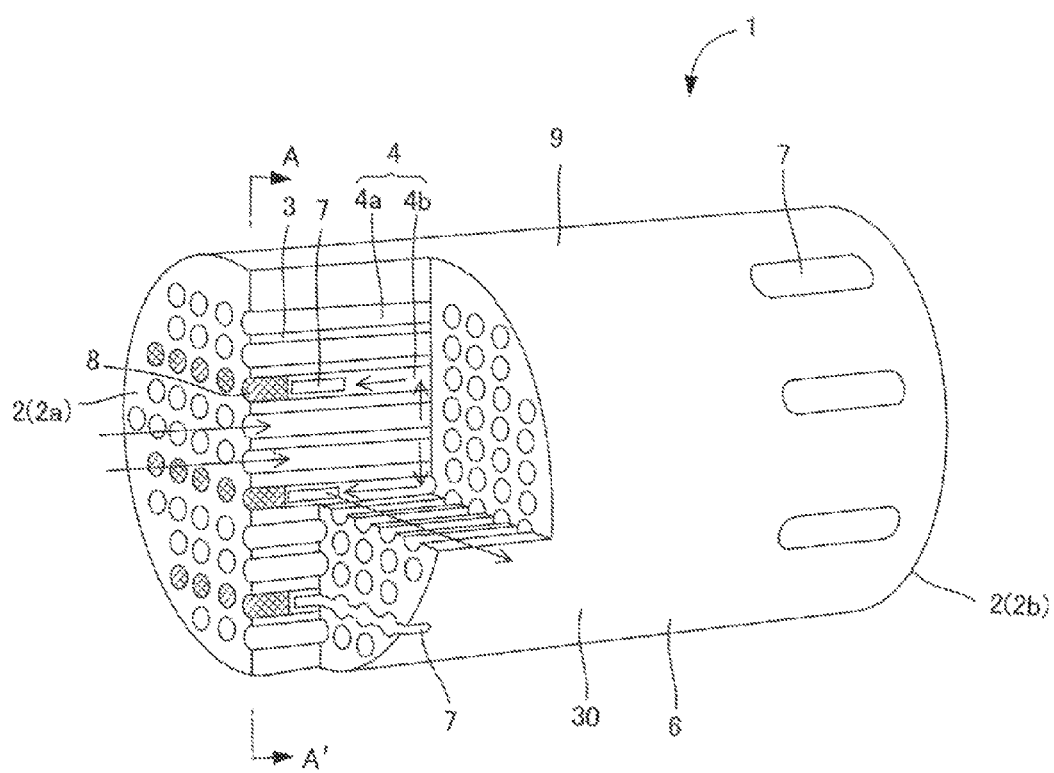
FIG. 1 is a perspective view of a part cut out, showing an embodiment of a ceramic separation-membrane structure of the present invention.
Figure 2:
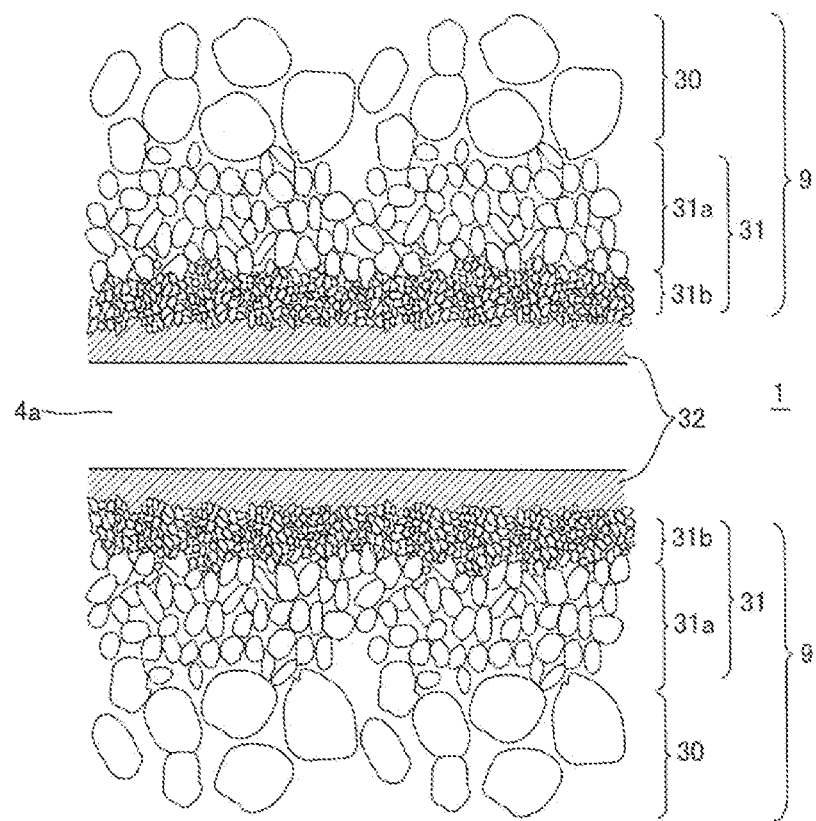
FIG. 2 is a partially enlarged cross-sectional view where a vicinity of a separation cell of the A-A' cross section in FIG. 1 was enlarged.

FIG. 1 shows an embodiment of a honeycomb-shaped ceramic separation-membrane structure 1 of the present invention. FIG. 2 shows a partially enlarged cross-sectional view where a vicinity of a separation cell of the A-A' cross section in FIG. 1 is enlarged. The honeycomb-shaped ceramic separation-membrane structure 1 (hereinbelow sometimes referred to simply as ceramic separation-membrane structure) is provided with a honeycomb-shaped base material 30, an intermediate layer 31, and a separation layer 32 (In the present specification, the base material 30 and the intermediate layer 31 are referred to as a ceramic porous body 9).

The honeycomb-shaped ceramic separation-membrane structure 1 has partition walls 3 of a ceramic porous body 9 (hereinbelow sometimes referred to simply as porous body 9) having a large number of pores formed therein, and cells 4 to function as flow passages for a fluid are formed by the partition walls 3. In the intermediate layer 31, a large number of pores are formed, and the average pore size is small in comparison with the surface of the base material 30, and the layer is disposed on the surface of the base material 30. At least a part of the ceramic porous body 9 has a structure where the aggregate particles are bonded to one another by an inorganic bonding material component. In other words, either the base material 30 or the intermediate layer 31 (when there is a plurality of intermediate layers 31 as described later, one of the layers) may be self-sintered (without any inorganic bonding material component). Since the base material 30 has a honeycomb shape, the membrane area per unit volume can be made large, and the treating capability can be raised.

The porous body 9 including the base material 30 and the intermediate layer 31 has a circular columnar external shape and an outer peripheral face 6. It is further provided with a plurality of separation cells 4a passing through from one end face 2a to the other end face 2b and formed in rows and a plurality of water collection cells 4b formed in rows from one end face 2a to the other end face 2b. In the ceramic separation-membrane structure 1, each of the separation cells 4a and the water collection cells 4b has a circular cross-sectional shape. Though the apertures of both the end faces 2a and 2b of the separation cells 4a are open (are left as apertures), the apertures of both the end faces 2a and 2b of the water collection cells 4b are plugged with plugging members to form plugged portions 8; and discharge flow passages 7 are provided in such a manner that the water collection cells 4b communicate with the external space. In addition, a separation layer 32 is disposed on the surface of the intermediate layer 31 of the inside wall face of each of the separation cells 4a having a circular cross-sectional shape. On the other hand, the water collection cells 4b are provided with neither the intermediate layer 31 nor the separation layer 32. It is preferable that a glass seal 35 is disposed so as to cover at least the end faces 2a, 2b of the base material 30. The ceramic separation-membrane structure 1 is a ceramic filter for separating a mixture.

In the ceramic separation-membrane structure 1, the internal pressure fracture strength fracturing the structure at the time that pressure is applied to the inside of the separation cells 4a is 7 MPa or more. The internal pressure fracture strength means pressure fracturing the ceramic separation-membrane structure 1 by applying the pressure to the inside of the separation cells 4a. Conventionally, there has been no honeycomb-shaped ceramic separation-membrane structure having an internal pressure fracture strength of 7 MPa or more. A ceramic separation-membrane structure 1 of the present invention has higher internal pressure fracture strength than a conventional one by specifying the base material thickness 40, the intermediate layer thickness 41 (see FIG. 3), and the proportion of the inorganic bonding material in the intermediate layer to be within predetermined ranges and the like. Hereinbelow, description will be given in more detail.

(Base Material)

It is preferable that the base material 30 has an average pore size of 5 to 25 μm. It is more preferably 6 to 20 μm. When the average pore size of the base material 30 is below 5 μm, the permeation rate of the permeation separation component separated by the separation layer 32 at the base material 30 becomes remarkably low, and the permeation flow rate per unit time may be reduced. On the other hand, when it is above 25 μm, the separation layer 32 cannot be formed uniformly, and the separation performance may be deteriorated.

In addition, it is preferable that the base material 30 has a porosity of 25 to 50%. The average pore size and the porosity are measured by a mercury porosimeter.

The material for the base material 30 is ceramic. It is preferable that the aggregate particles are of alumina ($Al_2O_3$), titania ($TiO_2$), mullite ($Al_2O_3 \cdot SiO_2$), powder of potsherd, cordierite ($Mg_2Al_4Si_5O_{18}$), or the like. Of these, alumina is further preferable in that a raw material (aggregate particles) having a controlled particle diameter can easily be obtained, that stable kneaded material can be formed, and that it has high corrosion resistance. The inorganic bonding material is preferably one selected from the group consisting of sinterable alumina, silica, glass frit, clay mineral, and sinterable cordierite. The inorganic bonding material is a bonding material for bonding the aggregate particles to one another and an inorganic component which is sintered and solidified at temperature where the aggregate component is not sintered. When alumina is selected as the aggregate component, the average particle diameter of the sinterable alumina is not larger than one tenth of that of the aggregate. When cordierite is selected as the aggregate component, the average particle diameter of sinterable cordierite is not larger than one tenth of that of the aggregate. Incidentally, regardless of the base material 30, the intermediate layer 31, or the like, the average particle diameter is measured by the "laser diffraction method". As the clay mineral, there can be mentioned kaolin, dolomite, montmorillonite, feldspar, calcite, talc, mica, and the like.

There is no particular limitation on the entire shape and size of the base material 30 as long as they do not hinder the separation function. As the entire shape, there can be mentioned shapes of, for example, a circular column (circular cylinder), a quadrangular prism (cylinder having a quadrangular cross section perpendicular to the central axis), and a triangular prism (cylinder having a triangular cross section perpendicular to the central axis). Of these, a circular column is preferable in that extrusion is easy, that firing deformation is little, and that sealing with the housing is easy. When it is used for precise filtration or ultrafiltration, the shape is preferably a circular column having a diameter of 30 to 220 mm in a cross section perpendicular to the central axis, and a length of 150 to 2000 mm in the central axial direction.

As the cross-sectional shape of the cells 4 (shape in a cross section perpendicular to the cell 4 extension direction) of the base material 30, there can be mentioned, for example, a circle, an ellipse, and a polygon. As the polygon, a quadrangle, a pentagon, a hexagon, a triangle, and the like can be mentioned. Incidentally, the cell 4 extension direction is the same as the central axial direction when the base material 30 has a circular columnar (circular cylindrical) shape.

When the cross-sectional shape of the cells 4 of the base material 30 is circular, the diameter of the cells 4 is preferably 1 to 5 mm. When it is smaller than 1 mm, the membrane area may become small. When it is larger than 5 mm, strength of the ceramic filter may be deteriorated.

Figure 3:
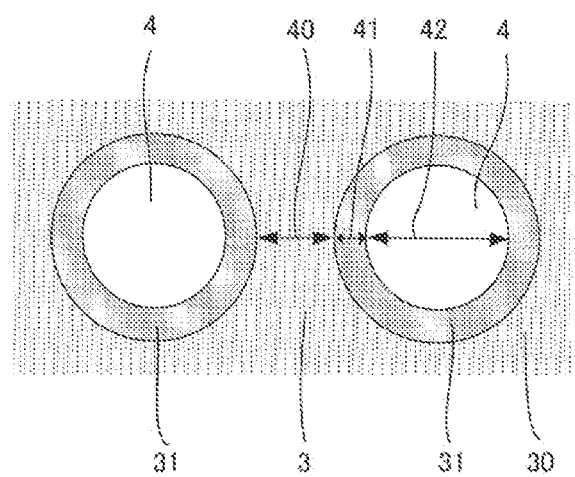
FIG. 3 is a schematic view showing an end face of the porous body.

In the base material 30, the base material thickness 40 excluding the intermediate layer 31 and the separation layer 32 at the shortest portion between the cells 4 is preferably 0.51 mm or more and 1.55 mm or less. The base material thickness 40 means thickness of the portion excluding the intermediate layer 31 and the separation layer 32 at the time that the base material 30 is formed by extrusion as shown in FIG. 3. The base material thickness 40 is more preferably 0.51 mm or more and 1.2 mm or less, furthermore preferably 0.65 mm or more and 1.0 mm or less. The base material thickness 40 of 0.51 mm or more enables to obtain sufficient internal pressure fracture strength. However, when the base material thickness 40 is too large, the number of cells which capable of forming in the fixed volume is reduced, and therefore the membrane area becomes small. Since this lowers the permeation flow rate, it is preferably 1.55 mm or less. Incidentally, the base material thickness 40 is the distance shown in FIG. 3 when the cells 4 are circular whereas it is the shortest distance between cells 4 when the cells have another shape.

(Intermediate Layer)

As shown in FIG. 2, an intermediate layer 31 is disposed on the base material 30, and a separation layer 32 is disposed on a surface (inside wall faces of the separation cells 4a) of the intermediate layer 31. Though only one intermediate layer 31 is sufficient for a ceramic separation-membrane structure 1 of the present invention, the average pore size of the intermediate layer 31 located as the lower layer under the separation layer 32 is preferably 0.005 to 2 μm. It is more preferably 0.05 μm or more and 1 μm or less, furthermore preferably 0.1 μm or more and 0.5 μm or less. By specifying it to 0.005 μm or more, large pressure loss and reduction in permeation rate can be inhibited. By specifying it to 2 μm or less, the strength can be increased, a long-term reliability as a ceramic separation-membrane structure 1 is enhanced, the separation layer thickness can be reduced for disposition, and the permeation rate can be increased.

When the intermediate layer 31 is constituted of a plurality of layers, it is preferable that the intermediate layers 31 are disposed in such a manner that the average pore size decreases in order from the base material 30 side to the separation layer 32 side. Specifically, it is preferable that the intermediate layer 31 is constituted of the first intermediate layer 31a having an average pore size of 1 μm order and the second intermediate layer 31b having an average pore size of 0.1 μm order.

The thickness of the intermediate layer 31 (the intermediate layer thickness 41) is preferably 150 μm or more and 500 μm or less. When the intermediate layer is constituted of a plurality of layers, the intermediate layer thickness 41 is total thickness of all the layers. It is more preferably 160 μm or more and 400 μm or less, furthermore preferably 200 μm or more and 300 μm or less.

It is preferable that the aggregate particles of the intermediate layer 31 are one selected from the group consisting of alumina, titania, mullite, powder of potsherd, and cordierite. In addition, the inorganic bonding material of the intermediate layer 31 is preferably one selected from the group consisting of sinterable alumina, silica, glass frit, clay mineral, and sinterable cordierite. The inorganic bonding material is an inorganic component which is sintered and solidified at temperature where the aggregate component is not sintered. When alumina is selected as the aggregate component, the average particle diameter of the sinterable alumina is not larger than one tenth of that of the aggregate. When cordierite is selected as the aggregate component, the average particle diameter of sinterable cordierite is not larger than one tenth of that of the aggregate. Incidentally, regardless of the base material 30, the intermediate layer 31, or the like, the average particle diameter is measured by the "laser diffraction method". As the clay mineral, there can be mentioned kaolin, dolomite, montmorillonite, feldspar, calcite, talc, mica, and the like.

It is preferable that the proportion of the inorganic bonding material component in the inorganic solid content of the intermediate layer 31 is 26% by mass or more and 42% by mass or less. It is more preferably 28% by mass or more and 42% by mass or less, furthermore preferably 30% by mass or more and 42% by mass or less. Incidentally, the proportion of the inorganic bonding material component in the inorganic solid content (mass %)=(inorganic bonding material)/(aggregate particles+inorganic bonding material)×100.

(Separation Layer)

The separation layer 32 has a plurality of pores formed therein, and the average pore size is small in comparison with the porous body 9 (the base material 30 and the intermediate layer 31), and the layer 32 is disposed on the wall faces (surfaces of the partition walls 3) inside the cells 4. Since a ceramic filter thus having a structure provided with a separation layer 32 exhibits a separation function exclusively by the separation layer 32, the average pore size of the porous body 9 can be made large. Therefore, the fluid-flow resistance at the time that the fluid having passed through the separation layer 32 and moved into the porous body 9 from the cells 4 passes through the inside of the porous body 9 can be reduced, and the fluid permeability can be enhanced.

The average pore size of the separation layer 32 can appropriately be determined depending on the filtration performance or separation performance required (depending on the particle size of the substance to be removed). For example, in the case of a ceramic filter used for precise filtration or ultrafiltration, it is preferably 0.01 to 1.0 μm. In this case, the average pore size of the separation layer 32 is measured by the air flow method described in ASTM F316.

As the separation layer 32, there can be employed a gas separation membrane and a reverse osmosis membrane. There is no particular limitation on the gas separation membrane, and it may suitably be selected according to the kind of gas to be separated, such as a known carbon monoxide separation membrane, helium separation membrane, hydrogen separation membrane, carbon membrane, zeolite membrane, silica membrane, and titania UF membrane. As the separation membrane 32, there can be mentioned, for example, the carbon monoxide separation membrane described in U.S. Pat. No. 4,006,107, the helium separation membrane described in U.S. Pat. No. 3,953,833, the hydrogen separation membrane described in U.S. Pat. No. 3,933,907, the carbon membrane described in JP-A-2003-286018, the DDR (Deca-Dodecasil 3R) type zeolite membrane complex described in JP-A-2004-66188, and the silica membrane described in WO No. 2008/050812.

When the separation layer 32 is a zeolite membrane, there can be used a zeolite having a crystal structure of LTA, MFI, MOR, FER, FAU, or DDR as the zeolite. When the separation layer 32 is a DDR type zeolite, it can be used particularly as a gas separation membrane used for selectively separating carbon dioxide.

(Plugged Portion)

The plugging member preferably contains aggregate particles, an inorganic bonding material, a binder, a thickener, and a water retention agent. The plugging member can be formed with the same material as the porous body 9. It is preferable that the plugged portion 8 has a porosity of 25 to 50%. When the porosity of the plugged portion 8 is above 50%, the solid content contained in the slurry for the intermediate layer used for forming the intermediate layer 31 may pass through the plugged portion 8. On the other hand, when the porosity of the plugged portion 8 is below 20%, discharge of the water content contained in the slurry for the intermediate layer used for forming the intermediate layer 31 may be difficult.

(Glass Seal)

In a ceramic separation-membrane structure 1 of the present invention, it is preferable to further provide a glass seal 35 so as to cover the porous body on the side, from which a mixed fluid flows therein, of the end face 2 of the ceramic separation-membrane structure 1 in order to suppress the mixed fluid containing a permeable separation component from directly flowing in from the porous body portion at the end face 2 of the ceramic separation-membrane structure 1 and flowing out without being separated by the separation layer 32 formed on the inside wall surfaces of the predetermined separation cells 4a.

The thickness of the glass seal 35 is preferably 30 to 500 μm. When it is thicker than 30 μm, the durability is improved, and when it is thinner than 500 μm, a fluid can flow therein without being hindered since the glass seal 35 does not spread out into the cells 4. When the glass seal 35 is thick, the ceramic filter may be heavy.

Though the material of the glass seal 35 is not particularly limited as long as it is glass which can be used as a seal material for a water treatment filter, alkali-free glass is preferable. By forming the glass seal 35 with alkali-free glass, the movement of alkali components from the glass seal 35 can be inhibited almost completely. Therefore, it inhibits condensation of alkali components derived from the glass seal 35 at the interface between the base material 30 or the separation layer 32 and the glass seal 35, and the corrosion resistance of the ceramic separation-membrane structure 1 can be improved dramatically. Therefore, corrosion of the base material 30 or the separation layer 32 in the vicinity of the glass seal 35 can be inhibited effectively, and the structure exhibits excellent corrosion resistance capable of withstand chemical washing many times.

(Separation Method)

Figure 4A:
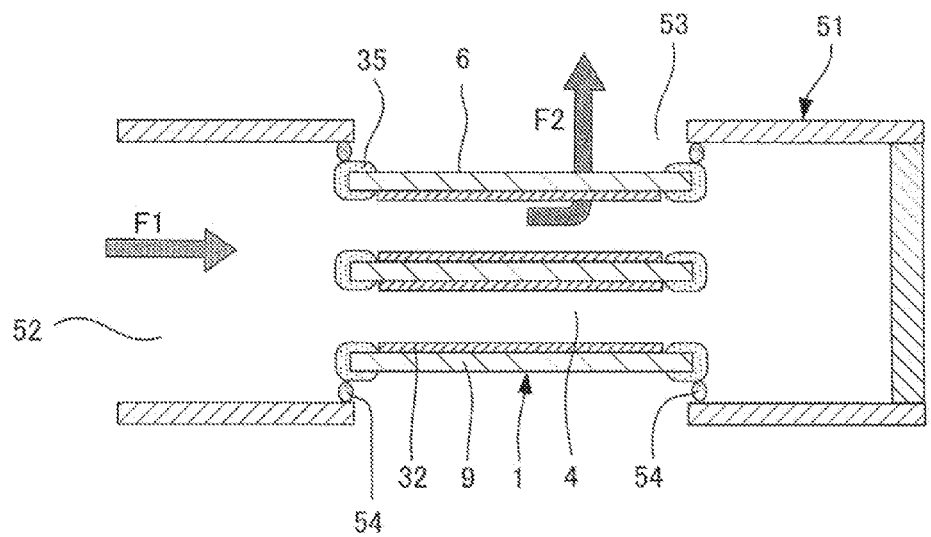
FIG. 4A is a schematic view showing a cross section parallel to the cell extension direction of the ceramic separation-membrane structure and showing an embodiment where the ceramic separation-membrane structure is put in a housing.

Next, there is described a method for separating some of the components from the mixture of several kinds of fluids by the use of the ceramic separation-membrane structure 1 of the present embodiment. As shown in FIG. 4A, when the fluid is separated by the use of the honeycomb-shaped ceramic separation-membrane structure 1 of the present embodiment, it is preferable that the ceramic separation-membrane structure 1 is put in a cylindrical housing 51 having a fluid inflow port 52 and a fluid outflow port 53, that the target fluid F1 to be treated which is allowed to flow in from the fluid inlet port 52 of the housing 51 is separated by the ceramic separation-membrane structure 1, and the separated treated fluid (treated fluid F2) is discharged from the fluid outflow port 53.

When the ceramic separation-membrane structure 1 is put in the housing 51, it is preferable that the gap between the ceramic separation-membrane structure 1 and the housing 51 is sealed with the seal material 54, 54 at both the end portions of the ceramic separation-membrane structure 1 as shown in FIG. 4A.

All the target fluid F1 having flowed into the housing 51 from the fluid inflow port 52 flows into the cells 4 of the ceramic separation-membrane structure 1, and the target fluid F1 having flowed into the cells 4 passes through the separation layer 32 and enters the base material 30 as the treated fluid F2. Then, it flows out of the base material 30 from the outer peripheral face 6 of the base material 30 and is discharged outside (into the external space) from the fluid outflow port 53. The seal material 54, 54 can inhibit the target fluid F1 from being mixed with the treated fluid F2.

Though there is no particular limitation on the material for the housing 51, for example, stainless steel can be mentioned. Though there is no particular limitation on the seal material 54, for example, an O-ring can be mentioned. As the material for the seal material 54, fluorine rubber, silicone rubber, ethylene, and propylene rubber can be mentioned. These materials are suitable for the use at high temperature for a long period of time.

Figure 4B:
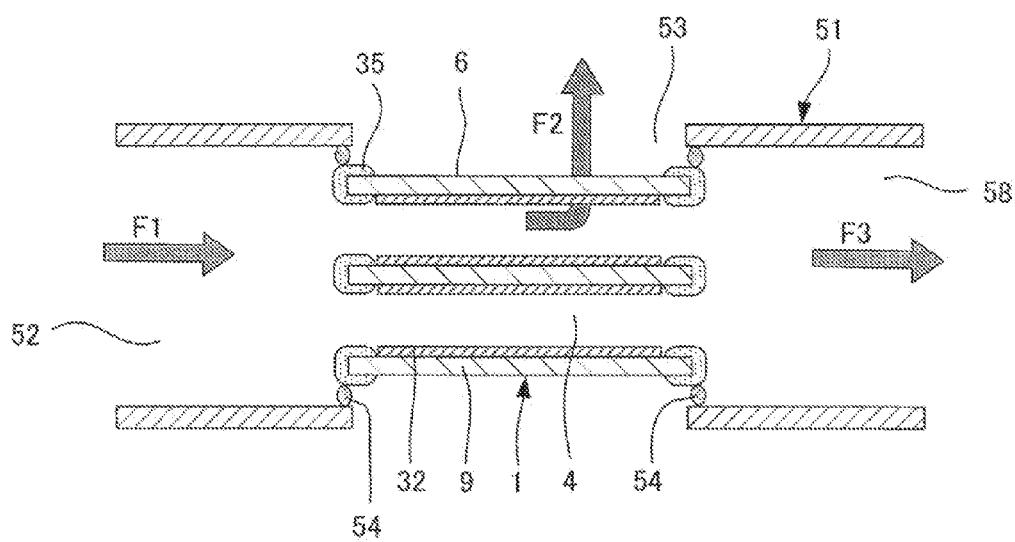
FIG. 4B is a schematic view showing a cross section parallel to the cell extension direction of the ceramic separation-membrane structure and showing another embodiment where the ceramic separation-membrane structure is put in a housing.

FIG. 4B shows another embodiment where the ceramic separation-membrane structure 1 is put in the housing 51. As shown in FIG. 4B, the ceramic separation-membrane structure 1 is put in the cylindrical housing 51 having the fluid inflow port 52 and the fluid outflow ports 53, 58. In the embodiment, the target fluid F1 allowed to flow in from the fluid inflow port 52 of the housing 51 is separated by the ceramic separation-membrane structure 1, the separated target fluid (treated fluid F2) is discharged from the fluid outflow port 53, and the rest (fluid F3) can be discharged from the fluid outflow port 58. Since the fluid F3 can be discharged from the fluid outflow port 58, flow rate of the target fluid F1 can be raised during the operation, and the permeation rate of the treated fluid F2 can be raised. Generally speaking, the permeation amount of the treated fluid F2 of the filter drops since a sedimentary layer of unfiltered component s is formed on the membrane surface. Even in gas separation, the permeation amount of the treated fluid F2 falls by concentration polarization where the concentration of the components which do not pass through the membrane increases. However, when the flow rate of the target fluid F1 is high, since unfiltered components flow to the fluid outflow port 58, the formation of the sedimentary layer and the concentration polarization are reduced, and clogging is hardly caused.

(Preparation Method)

Next, the preparation method of a ceramic separation-membrane structure 1 according to the present invention will be described. In the first place, a raw material for the porous body is formed. For example, extrusion is performed by the use of a vacuum extruder. This enables to obtain a honeycomb-shaped unfired base material 30 having separation cells 4a and water collection cells 4b. There are other methods such as press forming and casting, and the method can appropriately be selected.

Then, in the unfired base material 30 obtained above, discharge flow passages 7 communicating from one portion of the outer peripheral face 6 to another portion bypassing through the water collection cells 4b are formed. The discharge flow passages 7 can be formed, for example, by machining grooves on the outer peripheral face 6, breaking with a grinding stone or the like, and then breaking through the water collection cells 4b with a jig having an acute angle.

Next, plugging members in a slurried state are filled into the spaces from both the end faces 2a, 2b of the water collection cells 4b till they reach the discharge flow passages 7 of the unfired base material 30 with the discharge flow passages 7 obtained above. Specifically, a film (masking) of polyester or the like is attached to both the end faces 2a, 2b of the base material 30, and holes are made in portions corresponding to the specific separation cells 4a. Then, the end faces 2a, 2b provided with a film of the base material 30 are pressed against the inside of the container filled with the plugging member (slurry), and a pressure of, for example, 200 kg is further applied with an air cylinder or the like for the filling. Subsequently, the unfired base material 30 having plugging members obtained above is fired at, for example, 900 to 1400° C.

Then, on the inside wall faces of the separation cells 4a of the base material 30, a plurality of intermediate layers 31 functioning as a base for the separation layer 32 is formed. In the first place, slurry for the intermediate layers is prepared in order to form the intermediate layers 31 (form membranes). The slurry for the intermediate layers can be prepared by adding water to a ceramic raw material of alumina, mullite, titania, cordierite, or the like having a desired particle diameter (e.g., average particle diameter of 3.2 μm) of the same material as the base material 30. To the slurry for the intermediate layers, an inorganic bonding material is added in order to enhance the membrane strength after sintering. For the inorganic bonding material, there can be used clay, kaolin, titania sol, silica sol, glass frit, or the like. After the slurry for the intermediate layers is allowed to adhere to the inside wall faces of the separation cells 4a (by the use of, for example, a device disclosed in JP-A-61-238315), it is dried and sintered at, for example, 900 to 1050° C. to form the intermediate layers 31.

The intermediate layers 31 can be formed independently with plural kinds of slurry having varied average particle diameters. By disposing the second intermediate layer 31b on the first intermediate layer 31a, the influence of the unevenness of the surface of the porous body 9 can be reduced. As a result, even if the separation layer 32 is made thin, defects as the ceramic separation-membrane structure 1 can be reduced. That is, there can be obtained a ceramic separation-membrane structure 1 where a separation layer 32 having high flux, low cost, and high separation performance is disposed.

Next, the separation layer 32 is formed on the intermediate layer 31. The case of disposing a zeolite membrane as the separation layer 32 will be described. The zeolite membrane-forming method includes a particle adhesion step where zeolite particles are allowed to adhere to the porous body 9 by allowing slurry having zeolite particles serving as seeds dispersed therein to flow down by its own weight along the surface of the porous body 9 and a membrane-forming step where a zeolite membrane is formed on the porous body 9 by hydrothermal synthesis with immersing the porous body 9 having the zeolite particles adhering thereto in a sol. The flowing down in the particle adhesion step means that the slurry flows down on the surface of the porous body 9 by allowing the slurry to drop one by one freely by its own weight on the porous body 9. In the flow-down method, a large amount of liquid is allowed to flow in parallel with the surface by, for example, pouring slurry into holes of the porous body 9 having circular cylindrical holes. This allows the slurry poured to flow along the surface of the porous body 9 by its own weight. Therefore, penetrating into the porous body 9 is little. On the other hand, the conventionally known falling-drop method is a method of allowing a small amount of slurry to fall perpendicularly from above a flat plate, and the slurry falling down penetrates into the flat plate by its own weight. Therefore, the membrane becomes thick.

[1] Preparation of Slurry for Seeding and Seeding (Particle Adhesion Step)

A DDR type zeolite crystal powder is produced, and it is used as a seed crystal as it is or by being pulverized as necessary. The DDR type zeolite powder (serving as the seed crystal) is dispersed in a solvent to obtain slurry 64 (slurry for seeding). It is preferable to dilute the slurry for seeding by a solvent so that the concentration of the solid content contained therein becomes 1% by mass or less. As the solvent for dilution, water, ethanol, or ethanol aqueous solution is preferable. As the solvent used for the dilution, there may be used an organic solvent such as acetone or IPA or an organic solvent aqueous solution besides water or ethanol. Since the use of an organic solvent having high volatility can reduce drying time and reduce penetrating of the slurry 64 for seeding at the same time, a thinner zeolite membrane can be formed. Though a general stirring method can be employed as a method for dispersing the DDR type zeolite powder in the slurry, a method such as a supersonic wave treatment may be employed.

Figure 5:
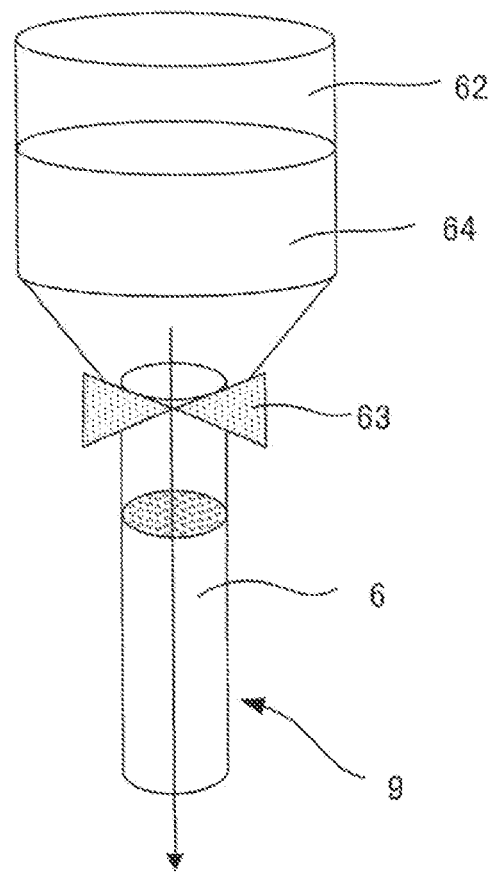
FIG. 5 is a schematic view showing a state of pouring seeding slurry in a particle adhesion step.

FIG. 5 shows one embodiment of seeding by a flow-down method (particle adhesion step). A porous body 9 is fixed to the lower end of a wide-mouth funnel 62, and a cock 63 is opened to allow the seeding slurry 64 to flow in from above the porous body 9 and to pass through the cells 4, thereby performing the particle adhesion step.

The concentration of the solid content in the slurry 64 for seeding (particle adhesion step) is preferably within the range from 0.00001 to 1% by mass, more preferably within the range from 0.0001 to 0.5% by mass, and furthermore preferably within the range from 0.0005 to 0.2% by mass. When the concentration is lower than the lower limit of the range for the concentration, the number of steps is increased to cause high costs. In addition, when it is above 1% by mass, a thick zeolite particle layer is formed on the surface of the porous body 9, and the thick membrane causes low flux.

For the slurry 64 in the particle adhesion step, water can be used as the solvent for dispersing the zeolite particles. An organic solvent or an organic solvent aqueous solution may be used. Further, ethanol, an ethanol aqueous solution, or the like may be used. In particular, when ethanol having high volatility is used as the solvent, since the inside portion of the porous body 9 is pressurized by volatilized ethanol right after the flowing, the flowing liquid is pushed out to the surface of the porous body 9, and the amount of the penetrating of the slurry for seeding can be reduced.

It is preferable to perform the step of allowing the slurry 64 containing zeolite particles as seeds to flow down in the particle adhesion step (FIG. 5) plural times. The plural times mean about 2 to 10 times. The more times increase quantity of work and costs. The number of times is preferably up to about 8, more preferably about 2 to 6. By performing the step plural times, the zeolite particle can adhere to the entire surface of the porous body 9 evenly.

It is preferable that the preparation method of a zeolite membrane according to the present invention includes a step of allowing the slurry 64 containing zeolite particles to flow down with flipping the porous body 9 upside down after the slurry 64 containing zeolite particles serving as seeds is allowed to flow down. This enables to allow the zeolite particles to adhere to the surface of the porous body 9 evenly and uniformly.

When the slurry 64 containing zeolite particles serving as seeds is allowed to flow down, it is desirable to perform masking with a seal tape or the like on the outer peripheral face 6 of the porous body 9. The masking enables to reduce the amount of penetrating of the slurry 64 for seeding and to allow the zeolite particles to adhere more uniformly. By reducing the amount of seeping of the slurry 64 for penetrating, a thinner zeolite membrane can be formed.

It is preferable that the manufacturing method of a zeolite membrane of the present invention includes a draught drying step after the slurry 64 containing zeolite particles serving as seeds is allowed to flow down. The draught drying means drying the slurry 64 by sending wind to the surface of the porous body 9 where the slurry 64 containing zeolite particles adheres. By performing the draught drying, the drying speed is raised, and the zeolite particles easily move to the surface and gather on the surface with the movement of the liquid at the time that the liquid evaporates.

In addition, the draught drying is preferably performed with humidified wind. By performing the draught drying with humidified wind, seeds can be fixed more strongly on the porous body 9. By fixing the seeds strongly on the porous body 9, detachment of the zeolite particles upon the following hydrothermal synthesis can be inhibited, and a zeolite membrane having less defects can be formed stably. Incidentally, the same effect can be obtained by including an exposure step of laying the porous body 9 subjected to draught drying with wind not subjected to humidification in water vapor after the flowing and seeding of the slurry 64.

[2] Preparation of Raw Material Solution (Sol)

Next, there is prepared a raw material solution having a predetermined composition including 1-adamantanamine dissolved in ethylenediamine.

Since 1-adamantanamine is a SDA (structure defining agent) in synthesis of a DDR type zeolite, that is, a substance to serve as a template for forming a crystal structure of the DDR type zeolite, the molar ratio to $SiO_2$ (silica) which is a raw material for the DDR type zeolite is important. The molar ratio of 1-adamantanamine/$SiO_2$ is necessarily within the range from 0.002 to 0.5, preferably within the range from 0.002 to 0.2, more preferably within the range from 0.002 to 0.03. When the molar ratio of 1-adamantanamine/$SiO_2$ is below this range, 1-adamantanamine of the SDA is insufficient, and therefore it is difficult to form a DDR type zeolite. On the other hand, when the molar ratio is above this range, expensive 1-adamantanamine is added more than necessary, which is not preferable from the viewpoint of production costs.

Since 1-adamantanamine is hardly soluble in water as a solvent for hydrothermal synthesis, it is subjected to preparation for a raw material solution after dissolving it in ethylenediamine. By preparing a raw material solution in a uniform condition with completely dissolving 1-adamantanamine in ethylenediamine, it becomes possible to form DDR type zeolite having a uniform crystal size. The molar ratio of ethylenediamine/1-adamantanamine is necessarily within the range from 4 to 35, preferably within the range from 8 to 24, more preferably within the range from 10 to 20. When the molar ratio of ethylenediamine/1-adamantanamine is below this range, the amount is insufficient for completely dissolving 1-adamantanamine. On the other hand, when the molar ratio is above this range, the ethylenediamine is used more than necessary, which is not preferable from the viewpoint of production costs.

According to the preparation method of the present invention, colloidal silica is used as a silica source. Though a commercially available colloidal silica can suitably be used as the colloidal silica, the colloidal silica can be prepared by dissolving minutely powdered silica in water or by subjecting alkoxide to hydrolysis.

The molar ratio of water contained in the raw material solution to $SiO_2$ (silica) (water/$SiO_2$ molar ratio) is necessarily within the range from 10 to 500, preferably within the range from 14 to 250, and more preferably within the range from 14 to 112. When the water/$SiO_2$ molar ratio is below this range, it is not preferable in that a large amount of unreacted $SiO_2$ which is not crystallized remains because the $SiO_2$ concentration of the raw material solution is too high. On the other hand, when it is above this range, it is not preferable in that a DDR type zeolite cannot be formed because the $SiO_2$ concentration of the raw material solution is too low.

According to the preparation method of the present invention, besides DDR type zeolite of all silica type, there can be manufactured DDR type zeolite containing aluminum and metal cation in the framework (hereinbelow referred to as "DDR type zeolite of low silica type"). Since the DDR type zeolite of low silica type has a cation in pores, its adsorption performance and catalyst performance are different from those of DDR type zeolite of all silica type. In the case of manufacturing DDR type zeolite of low silica type, a raw material solution is prepared by adding an aluminum source and a cation source besides water as the solvent and colloidal silica as the silica source.

As the aluminum source, there can be used aluminum sulfate, sodium aluminate, metal aluminum, or the like. The $SiO_2/Al_2O_3$ molar ratio in the case of converting aluminum to its oxide is necessarily within the range from 50 to 1000, preferably within the range from 70 to 300, more preferably within the range from 90 to 200. When the $SiO_2/Al_2O_3$ molar ratio is below this range, it is not preferable in that the proportion of amorphous $SiO_2$ other than DDR type zeolite increases. On the other hand, when it is above this range, it is not preferable in that the properties as DDR type zeolite of low silica type cannot be exhibited due to remarkable reduction of the amount of aluminum and cation though DDR type zeolite can be manufactured, which makes no difference from zeolite of all silica type.

As the cation, there can be mentioned a cation of one of alkali metals, i.e., K, Na, Li, Rb, and Cs. As the cation source, if Na is taken for example, there can be mentioned sodium hydroxide, sodium aluminate, and the like. The $X_2O/Al_2O_3$ molar ratio in the case of converting alkali metal as the oxide is necessary within the range from 1 to 25, preferably within the range from 3 to 20, and more preferably within the range from 6 to 15. When the $X_2O/Al_2O_3$ molar ratio is below this range, it is not preferable in that DDR type zeolite having the aimed $SiO_2/Al_2O_3$ molar ratio is hardly obtained. On the other hand, when it is above this range, it is not preferable in that amorphous $SiO_2$ is mixed in the product.

Preparation of a raw material solution has been described above. As a particularly preferable mode, there can be mentioned a method of preparing a raw material solution by mixing a solution where 1-adamantanamine is dissolved in ethylenediamine, water as a solvent, and colloidal silica (in the case of synthesizing low silica type DDR, further aluminum sulfate as the aluminum source and sodium hydroxide the a cation source) at a predetermined ratio and dissolving them.

[3] Membrane Formation (Membrane Formation Step)

Figure 6:
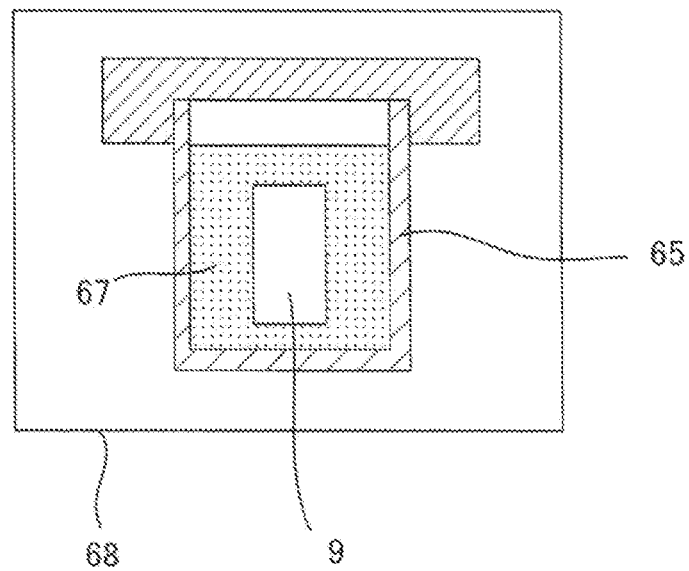
FIG. 6 is a schematic view showing an embodiment of a membrane formation step of forming a zeolite membrane on a porous body by hydrothermal synthesis.

A container (e.g., a jar) containing the raw material solution is set in a homogenizer for agitation to obtain a sol 67 used for hydrothermal synthesis. Next, as shown in FIG. 6, the porous body 9 subjected to seeding by the flow-down method is put in a pressure resistant container 65, and, after the sol 67 prepared above is put therein, these are put in a dryer 68 and subjected to a heating treatment (hydrothermal synthesis) at 110 to 200° C. for 16 to 120 hours to obtain a zeolite membrane.

The temperature of the heating treatment (synthesis temperature) is preferably within the range from 110 to 200° C., more preferably 120 to 180° C., and particularly preferably 120 to 170° C. When the temperature of the heating treatment is below this range, it is not preferable in that DDR type zeolite cannot be formed. On the other hand, when it is above the range, it is not preferable in that unintended DOH type zeolite is formed due to phase transition.

Regarding the time for the heating treatment (synthesis time) in the preparation method of the present invention, very short time of several hours to five days is sufficient. In the preparation method of the present invention, since the DDR type zeolite powder is added to a base material by a flow-down method, crystallization of DDR type zeolite is facilitated.

In the preparation method of the present invention, it is not necessary to always stir the raw material solution (sol 67) during the heating treatment. This is because, since 1-adamantanamine to be contained in the raw material solution is dissolved in ethylenediamine, the raw material solution is maintained in a uniform state. Incidentally, whereas mixed crystals of DDR and DOH may be formed if the raw material solution is not always stirred in a conventional method, single-phase crystals of DDR can be formed without forming DOH even if the raw material solution is not always stirred according to the preparation method of the present invention.

[4] Washing and Removing Structure Defining Agent

Next, the porous body 9 having a zeolite membrane formed thereon is washed with water or by boiling at 80 to 100° C., and then it is taken out and dried at 80 to 100° C. Then, the porous body 9 is put in an electric furnace and heated at 400 to 800° C. for 1 to 200 hours in the ambient atmosphere to remove 1-adamantanamine in the pores of the zeolite membrane by combustion. The above enables to form a thin and uniform zeolite membrane having a thickness of 10 μm or less and less defects than a conventional one.

The preparation method of a zeolite membrane of the present invention can be applied to zeolites having a crystal structure of LTA, MFI, MOR, FER, FAU, or DDR.

Next, there is described a case of disposing a silica membrane as a separation layer 32 on the intermediate layer 31. The precursor solution (silica sol solution) to form a silica membrane can be prepared by subjecting tetraethoxysilane to hydrolysis in the presence of nitric acid to obtain sol and diluting the sol with ethanol. In place of dilution with ethanol, dilution with water is possible. By pouring precursor solution (silica sol solution) to form a silica membrane from above the porous body 9 and passing it through the separation cells 4a or by general dipping, the precursor solution is allowed to adhere to the inside wall faces of the separation cells 4a. Then, after the temperature is raised at a rate of 100° C./hour and maintained at 500° C. for one hour, the temperature is lowered at 100° C./hour. Such operations of pouring, drying, raising temperature, and lowering temperature are repeated 3 to 5 times to dispose a silica membrane. As described above, a ceramic separation-membrane structure 1 having a silica membrane as the separation layer 32 can be obtained.

Next, a description will be made regarding a case of disposing a carbon membrane as the separation layer 32 on the intermediate layer 31. In this case, a membrane may be formed by bringing a precursor solution which forms a carbon membrane into contact with the surface of the porous body 9 by means of dip coating, immersion, spin coating, spray coating, or the like. The precursor solution can be obtained by mixing and dissolving a thermosetting resin such as phenol resin, melamine resin, urea resin, furan resin, polyimide resin, and epoxy resin; a thermoplastic resin such as polyethylene; cellulose-based resin; or precursor substances of these resins in an organic solvent such as methanol, acetone, tetrahydrofuran, NMP, and toluene; water; or the like. When a membrane is formed from the precursor solution, an appropriate thermal treatment may be performed according to the kind of the resin contained therein. The precursor membrane obtained in such a manner is carbonized to obtain a carbon membrane.

A description will be made regarding a case of disposing a titania UF membrane as the separation layer 32 on the intermediate layer 31. In the first place, titanium isopropoxide is hydrolyzed in the presence of and nitric acid to obtain a titania sol solution. Then, the titania sol solution is diluted with water to obtain a sol solution for forming a membrane, and the sol solution is passed through the cells 4 to form a titania UF membrane in the cells 4.

Figure 7:
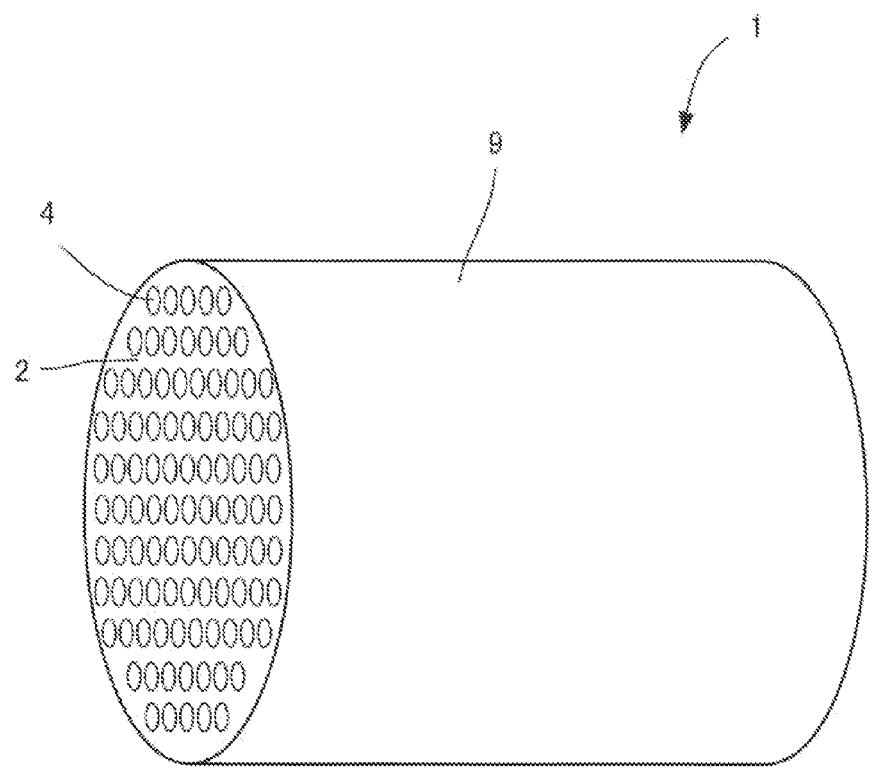
FIG. 7 is a perspective view showing another membrane of a ceramic separation-membrane structure of the present invention.

Though there has been described an embodiment having plugged portions 8 formed by plugging end faces 2 with plugging members, separation cells 4a, water collection cells 4b, and discharge flow passages 7 as a ceramic separation-membrane structure 1; as shown in FIG. 7, the structure may have no plugging, be provided with a separation layer 32 in all the cells 4 of the honeycomb-structured porous body 9 and with no water collection cell 4b and no discharge flow passage 7.

Example

Hereinbelow, the present invention will be described in more detail on the basis of Examples. However, the present invention is not limited to these Examples.

(Base Material)

A kneaded material was prepared by adding 20 parts by mass of an inorganic bonding material (sintering auxiliary) with respect to 100 parts by mass of alumina particles (aggregate particles) having an average particle diameter of 50 μm, and water, a dispersant, and a thickener were added to them, followed by mixing and kneading. The kneaded material was extruded to manufacture a honeycomb-shaped unfired base material 30.

As the inorganic bonding material, there was used a material obtained by melting a glass raw material containing $SiO_2$ (80 mol %), $Al_2O_3$ (10 mol %), and alkali earth (8 mol %) at 1600° C. for uniformalization; and, after it was cooled, it was pulverized to obtain an average particle diameter of 1 μm.

In the unfired base material 30, discharge flow passages 7 communicating from one portion of the outer peripheral face 6 to another portion by passing through the water collection cells 4b were formed.

Next, slurried plugging member was filled in the spaces from both the end faces 2a, 2b till it reached the discharge flow passages 7 of the base material 30. Then, the base material 30 was fired. The firing conditions were 1250° C. and one hour with both the temperature rise rate and the temperature fall rate of 100° C./hour.

Next, the intermediate layer 31 of an alumina porous body having a thickness of 150 μm and an average pore size of 0.5 μm was formed on the wall surfaces inside the cells 4 of the base material 30. The average pore size was measured by the air flow method described in ASTM F316.

In the first place, slurry was prepared by adding 14 parts by mass of an inorganic bonding material to 100 parts by mass of alumina particles (aggregate particles) having an average particle diameter of 3.5 μm, and water, a dispersant, and a thickener were further added to them, followed by mixing. Using the slurry, the slurry was allowed to adhere to the inner peripheral face of the base material 30 by the filtration membrane-forming method described in JP-B-63-66566. Then, firing was performed in an electric furnace in the ambient atmosphere to form the first intermediate layer 31a. As the firing conditions, 950° C. for one hour was employed with both the temperature ascending rate and the temperature descending rate of 100° C./hour. As the inorganic bonding material, there was used a material obtained by melting a glass raw material containing $SiO_2$ (77 mol %), $ZrO_2$ (10 mol %), $Li_2O$ (3.5 mol %), $Na_2O$ (4 mol %), $K_2O$ (4 mol %), CaO (0.7 mol %), and MgO (0.8 mol %) at 1600° C. for uniformalization; cooling it; and then pulverizing to obtain an average particle diameter of 1 μm.

Next, the second intermediate layer 31b of a titania porous body having a thickness of 15 μm and average pore size of 0.1 μm was formed on the inner peripheral wall (surface of the surface layer) of the porous body 9. The average pore size was measured by the air flow method described in ASTM F316.

The porous body 9 had a circular columnar external shape having an outer diameter of 30 mm and a length of 160 mm. In Table 1, the base material thickness 40, the intermediate layer thickness 41, and the cell diameter 42 of the cells having a circular cross-sectional shape are shown, respectively.

(Forming of Glass Seal)

Next, a glass seal 35 was disposed on both the end faces 2a, 2b of the base material 30 in the state that the aperture portions of the cells 4 were not clogged. In the first place, slurry was prepared by adding alumina particles (ceramic particles), water, and an organic binder to the inorganic bonding material as a raw material for the glass seal 35, followed by mixing. The portion of the alumina particles (ceramic particles) in the mixture was 40% by mass with respect to the total mass of the inorganic bonding material and the alumina particles. The portion of water in the mixture was 65 parts by mass when the total mass of the inorganic bonding material and the alumina particles was regarded as 100 parts by mass, and the portion of the organic binder in the mixture was 7 parts by mass when the total mass of the inorganic bonding material and the alumina particles was regarded as 100 parts by mass. As the organic binder, methyl cellulose was used. The slurry obtained above was applied to both the end faces 2a, 2b of the base material 30, followed by drying and firing to obtain the glass seals 35. The thickness of the glass seals 35 was 200 μm. The firing conditions were the same as those of the aforementioned preparing method of the intermediate layer 31. The average particle diameter of the alumina particles (ceramic particles) in the glass seal 35 was 14 μm.

In addition, the inorganic bonding material used as the raw material for the glass seals 35 was a material obtained by melting a glass raw material containing $SiO_2$ (63 mol %), $ZrO_2$ (3 mol %), $Al_2O_3$ (5 mol %), CaO (9 mol %), BaO (17 mol %), and $B_2O_3$ (3 mol %) at 1600° C. for homogenization; cooling it; and then pulverizing it to obtain an average particle diameter of 15 μm.

(Forming of DDR Membrane)

As the separation layer 32, a DDR membrane was formed on the intermediate layer 31.

(1) Preparation of Seed Crystal

A DDR type zeolite crystal powder was manufactured on the basis of the method for preparing DDR type zeolite described in M. J. den Exter, J. C. Jansen, H. van Bekkum, Studies in Surface Science and Catalysis Vol. 84, Ed. by J. Weitkamp et al., Elsevier (1994) 1159-1166 or JP-A-2004-083375. It was used as a seed crystal as it was or by pulverizing as necessary. After synthesis or after dispersing the pulverized seed crystal in water, coarse particles were removed to prepare a seed crystal dispersion liquid.

(2) Seeding (Particle Adhesion Step)

The seed crystal dispersion liquid prepared in (1) was diluted by ion-exchanged water or ethanol, the DDR concentration was adjusted to be 0.001 to 0.36% by mass (solid content concentration in slurry 64), and it was stirred with a stirrer at 300 rpm to obtain slurry for seeding (slurry 64). The porous body 9 was fixed to the lower end of a wide-mouth funnel 62, and slurry for seeding of 160 ml was poured into the porous body 9 from above and passed through the cells (see FIG. 5). At this time, after masking the outer peripheral face 6 of the porous body 9 with a Teflon (registered trademark), seeding was performed. In the porous body 9 where the slurry 64 was poured, the insides of the cells were subjected to draught drying at room temperature or at 80° C. at a wind speed of 3 to 6 m/s for 10 to 30 minutes. Pouring of the slurry 64 and the draught drying were repeated 1 to 6 times to obtain a sample. After the drying, microstructure observation with an electron microscope was performed. Adhesion of DDR particles to the surface of the porous body 9 was confirmed.

(3) Membrane Formation (Membrane Formation Step)

After putting 7.35 g of ethylenediamine (produced by Wako Pure Chemical Industries, Ltd.) in a 100 ml fluorine resin jar, 1.156 g of 1-adamantanamine (produced by Sigma-Aldrich Japan Co.) was added thereto and dissolved so that no precipitation of 1-adamantanamine might remain. In another container, 98.0 g of 30% by mass of colloidal silica (Snowtex S produced by Nissan Chemical Industries, Ltd.) and 116.55 g of ion-exchanged water were put, and they were slightly stirred. Then, the mixture was put in the jar containing the mixed ethylenediamine and 1-adamantanamine and strongly shaken to prepare a raw material solution. Molar ratios of components in the raw material solution were 1-adamantanamine/$SiO_2$=0.016, water/$SiO_2$=21). Then, the jar containing the raw material solution was set in a homogenizer, and stirring was performed for one hour. The porous body 9 having DDR particles adhering thereto obtained in (2) was disposed in a stainless steel pressure resistant container 65 provided with a fluorine resin internal cylinder having an internal capacity of 300 ml, and the raw material solution (sol 67) prepared above was put therein to perform a heating treatment (hydrothermal synthesis) at 140° C. for 50 hours (see FIG. 6). Upon hydrothermal synthesis, it was alkaline due to colloidal silica and ethylenediamine of the raw material. A fracture cross section of the porous body 9 having membrane formed thereon was observed with a scanning electron microscope, and it was found that the thickness of the DDR membrane was 10 μm or less.

(4) Removal of Structure Defining Agent

The coated membrane was heated at 450 or 500° C. for 50 hours in the ambient atmosphere in an electric furnace to remove 1-adamantanamine in the pores by combustion. The crystal phase was identified by X-ray diffraction to confirm DDR type zeolite. In addition, after the membrane was formed, it was confirmed that the porous body 9 was covered with DDR type zeolite.

(Forming of Titania UF Membrane)

As the separation layer, a titania UF membrane was formed on the intermediate layer 31. Titanium isopropoxide was subjected to hydrolysis in the presence of nitric acid to obtain a titania sol solution. The sol particle diameter measured by a dynamic light-scattering method was 100 nm.

The titania sol solution was diluted with water, and PVA as an organic binder was appropriately added thereto to obtain a sol solution for forming a membrane. It was passed through the cells 4 to form a membrane in the cells 4. After the sample was dried, it was thermally treated at 500° C. to form a titania OF membrane.

(Forming of Silica Membrane)

As the separation layer, a silica membrane was formed on the intermediate layer 31. The precursor solution (silica sol solution) to form a silica membrane was prepared by subjecting tetraethoxysilane to hydrolysis in the presence of nitric acid to obtain a sol solution and diluting the sol solution with ethanol. The precursor solution (silica sol solution) to form a silica membrane was poured from above the porous body 9 having an intermediate layer formed thereon, and the solution was passed through the separation cells 4a to allow the precursor solution to adhere to the inside wall faces of the separation cells 4a. Then, temperature was raised at 100° C./hour, and, after the temperature was maintained at 500° C. for one hour, the temperature was lowered at 100° C./hour. Such operations of pouring, drying, raising temperature, and lowering temperature were repeated 3 to 5 times to dispose a silica membrane.

(Forming of Carbon Membrane)

As the separation layer, a carbon membrane was formed on an intermediate layer 31. A precursor solution was obtained by mixing and dissolving a phenol resin in an organic solvent. The precursor solution to form a carbon membrane was brought into contact with the surface of the porous body 9 by dip coating to form a carbon membrane.

As shown in FIG. 4A, the ceramic separation-membrane structure 1 was put in a cylindrical housing 51 having a fluid inflow port 52 and a fluid outflow port 53, and pressure was applied by water by allowing the water to flow in from the fluid inlet port 52 of the housing 51 to examine the strength with which the ceramic separation-membrane structure 1 was fractured. When the pressure was not raised because of water permeation, water permeation was blocked by coating natural latex rubber on the inside faces of the cells 4 and drying it to measure the internal pressure fracture strength.

TABLE 1

| | Base material thickness mm | Intermediate layer thickness mm | Proportion of inorganic bonding material mass % | Cell diameter mm | Internal pressure fracture strength MPa | Material for separation layer |
| --- | --- | --- | --- | --- | --- | --- |
| Comp. Ex. 1 | 0.51 | 0.10 | 36 | 2.9 | 6.7 | DDR membrane |
| Example 1 | 0.51 | 0.15 | 36 | 2.8 | 8.8 | DDR membrane |
| Example 2 | 0.51 | 0.20 | 36 | 2.7 | 10.5 | DDR membrane |
| Example 3 | 0.51 | 0.25 | 36 | 2.6 | 11.3 | DDR membrane |
| Example 4 | 0.51 | 0.30 | 36 | 2.5 | 10.7 | DDR membrane |
| Example 5 | 0.51 | 0.50 | 36 | 2.3 | 8.0 | DDR membrane |
| Comp. Ex. 2 | 0.51 | 0.60 | 36 | 2.0 | 6.8 | DDR membrane |
| Example 6 | 0.65 | 0.15 | 26 | 2.5 | 8.9 | DDR membrane |
| Example 7 | 0.65 | 0.15 | 26 | 2.5 | 8.8 | Titania UF membrane |
| Example 8 | 0.65 | 0.15 | 26 | 2.5 | 8.8 | Silica membrane |
| Example 9 | 0.65 | 0.15 | 26 | 2.5 | 8.8 | Carbon membrane |

Examples 1 to 5, Comparative Examples 1 and 2

In Comparative Example 1, the intermediate layer 31 had a thickness of below 0.15 mm, whereas, in Comparative Example 2, the intermediate layer 31 had a thickness of above 0.5 mm, and the internal pressure fracture strength was below 7 MPa. On the other hand, in Examples 1 to 5, the intermediate layer 31 had a thickness of 0.15 mm to 0.5 mm, and the internal pressure fracture strength was 7 MPa. It was found out that, when the intermediate layer 31 is not within the range from 0.15 mm to 0.5 mm, sufficient internal pressure fracture strength cannot be obtained.

Example 6 to 9

Example 6 is a case of a DDR membrane, Example 7 is a case of a titania UF membrane, Example 8 is a case of a silica membrane, and Example 9 is a case of a carbon membrane. In any of the cases for the separation layer 32, sufficient internal pressure fracture strength was obtained.

TABLE 2

|  | Base material thickness mm | Intermediate layer thickness mm | Proportion of inorganic bonding material mass % | Cell diameter mm | Internal pressure fracture strength MPa | Material for separation layer | Membrane area (porous body: outer diameter of 30 mm, length of 160 mm) cm² |
|---|---|---|---|---|---|---|---|
| Example 1 | 0.51 | 0.15 | 36 | 2.8 | 8.8 | DDR membrane | 502 |
| Example 10 | 0.65 | 0.15 | 36 | 2.5 | 11.3 | DDR membrane | 432 |
| Example 11 | 1.55 | 0.15 | 36 | 2.3 | 17.5 | DDR membrane | 246 |

Example 1, 10, and 11

The base material thickness 40 of the base materials 30 was varied. Due to the base material thickness 40 of 0.51 mm or more, sufficient internal pressure fracture strength was obtained. In addition, when it was 0.65 mm or more, more sufficient internal pressure fracture strength was obtained. However, when the base material thickness 40 is too large, since the number of cells capable of being disposed in a certain volume is reduced, the membrane area is reduced. Since this lowers the permeation flow amount, it was preferably 1.55 mm or less.

TABLE 3

|  | Base material thickness mm | Intermediate layer thickness mm | Proportion of inorganic bonding material mass % | Cell diameter mm | Internal pressure fracture strength MPa | Material for separation layer |
|---|---|---|---|---|---|---|
| Example 6 | 0.65 | 0.15 | 26 | 2.5 | 8.9 | DDR membrane |
| Example 12 | 0.65 | 0.15 | 28 | 2.5 | 9.8 | DDR membrane |
| Example 10 | 0.65 | 0.15 | 36 | 2.5 | 11.3 | DDR membrane |
| Example 13 | 0.65 | 0.15 | 42 | 2.5 | 10.9 | DDR membrane |

Examples 6, 10, 12, 13

The proportion of the inorganic bonding material component was varied. Sufficient internal pressure fracture strength was obtained due to a proportion of the inorganic bonding material component of 30% by mass or more and 42% by mass or less. When the proportion of the inorganic bonding material was large, the separation layer 32 was hardly formed. In the case of a DDR type zeolite, since a seed crystal hardly adheres to the surface, a DDR type zeolite membrane was hardly formed.

INDUSTRIAL APPLICABILITY

A ceramic separation-membrane structure of the present invention can suitably be used as a means for separating part of components from a mixed fluid.

DESCRIPTION OF REFERENCE NUMERALS

1: ceramic separation-membrane structure, 2, 2a, 2b: end face, 3: partition wall, 4: cell, 4a: separation cell, 4b: water collection cell, 6: outer peripheral face, 7: discharge flow passage, 8: plugged portion, 9: porous body, 30: base material, 31: intermediate layer, 31a: first intermediate layer, 31b: second intermediate layer, 32: separation layer, 35: glass seal, 40: base material thickness, 41: intermediate layer thickness, 42: cell diameter, 51: housing, 52: fluid inflow port, 53, 58: fluid outflow port, 54: seal material, 62: wide-mouth funnel, 63: cock, 64: slurry, 65: pressure resistant container, 67: sol, 68: dryer

The invention claimed is:

1. A honeycomb-shaped ceramic separation-membrane structure comprising:
a honeycomb-shaped base material having partition walls of a ceramic porous body having pores formed therein and a plurality of cells formed by the partition walls and functioning as passages for a fluid passing through the ceramic porous body,
an intermediate layer of a ceramic porous body having pores with a smaller average pore diameter than pores in a surface of the base material and being disposed on the surface of the base material, and
a separation layer formed of zeolite disposed on a surface of the intermediate layer;
wherein at least a part of the base material and the intermediate layer has a structure where aggregate particles are bonded to one another by an inorganic bonding material component,
the intermediate layer thickness is 150 μm or more and 500 μm or less;
the base material thickness at the shortest portion between the cells is 0.51 mm or more and 1.55 mm or less;
the proportion of an inorganic bonding material component in an inorganic solid content of the intermediate layer is 26% by mass or more and 42% by mass or less; and
an internal pressure fracture strength when pressure is applied to the inside of the cells is 7 MPa or more.

2. The honeycomb-shaped ceramic separation-membrane structure according to claim 1, wherein
the aggregate particles of the base material and the intermediate layer are one selected from the group consisting of alumina, titania, mullite, powder of potsherd, and cordierite, and
the inorganic bonding material of the base material and the intermediate layer is one selected from the group consisting of sinterable alumina, silica, glass frit, clay mineral, and sinterable cordierite.

3. The honeycomb-shaped ceramic separation-membrane structure according to claim 1, wherein
the base material has an average pore size of 5 μm to 25 μm, and
the intermediate layer has an average pore size of 0.005 μm to 2 μm.

4. The honeycomb-shaped ceramic separation-membrane structure according to claim 1, which is a gas separation membrane.

5. The honeycomb-shaped ceramic separation-membrane structure according to claim 1, wherein the separation layer is formed of DDR type zeolite.

6. The honeycomb-shaped ceramic separation-membrane structure according to claim 5, which is a carbon dioxide separation membrane.

* * * * *